Feb. 24, 1970　　　　　　H. B. GOODWIN　　　　　3,497,396
MOISTURE CONSERVING PRESSURE CONTROL UNIT FOR
ELECTROCHEMICAL CELLS
Filed April 28, 1967

Inventor:
Howard B. Goodwin,
by Carl O. Thomas
His Attorney.

United States Patent Office 3,497,396
Patented Feb. 24, 1970

3,497,396
MOISTURE CONSERVING PRESSURE CONTROL
UNIT FOR ELECTROCHEMICAL CELLS
Howard B. Goodwin, Gainesville, Fla., assignor to General
Electric Company, a corporation of New York
Filed Apr. 28, 1967, Ser. No. 634,568
Int. Cl. H01m 1/06
U.S. Cl. 136—179                              6 Claims

ABSTRACT OF THE DISCLOSURE

A venting unit provided with a valve and a gas reaction chamber. The valve having an element of a density less than that of the liquid formed in the reaction chamber so that the liquid formed in the chamber will be returned to a battery and also permit gases from the battery to pass to the reaction chamber. The unit is further provided with a valve seat between the reaction chamber and valve element to prevent electrolyte from the battery from entering the reaction chamber.

My invention is directed to a unit for both confining the fluid contents of and controlling the internal pressurization of an electrochemical cell which evolves gas upon being electrically driven.

Venting is perhaps the most commonly employed approach for preventing over-pressurization of an electrochemical cell upon its being electrically driven. Typically the tendency toward pressurization is attributable to the evolution of hydrogen and oxygen upon cell overcharge. In certain applications, however, gas evolution may also occur upon overdischarge or when employing a high rate of charge. In cells having uneven positive and negative plate capacity, either hydrogen or oxygen may be selectively evolved.

There are several disadvantages associated with venting. First, venting leads to the requirement of periodic servicing to replenish water lost from the electrolyte during electrolysis or by evaporation through the vent on prolonged standing of the cell. Incorporation of a vent also usually prevents a cell from being inverted without having the electrolyte drain out. Another disadvantage is that gaseous electrolysis products which emerge from the vent may be undesirable or even hazardous under the conditions of use. For example, the evolution of stoichiometric quantities of hydrogen and oxygen from a cell being used in a closed space may produce an explosion.

Some of the disadvantages associated with venting have been heretofor obviated by attaching to the vent of a cell casing a unit containing a chemical capable of reacting with or catalyzing the reaction of at least one of the gaseous constituents evolving from the cell. This then prevents an explosive mixture of gases from being exhausted to the atmosphere. Henningan et al., Patent No. 3,287,174, for example, teaches the incorporation of palladium oxide in such a unit to prevent hydrogen from escaping to the atmosphere. In another form the receptacle may contain a hydrogen-oxygen recombination catalyst. In such form the evolution of a potentially explosive mixture is again avoided and, in addition, water is formed as a reaction product which may be returned to the cell to replenish water consumed in electrolysis. An exemplary unit of this type is disclosed by Gulick et al. in Patent No. 2,687,449.

At best such units merely deal with the handling of electrolysis products from a vented cell. Other disadvantages associated with vented structures, such as electrolyte loss by evaporation and lack of physical inversion capability, are not solved. Further, conventional units are incapable of returning reconstituted water to the cell, but rather allow a substantial portion of such moisture to escape to the atmosphere in the vapor phase.

It is an object of my invention to provide a unit for minimizing fluid losses from a vented cell.

It is another object to provide a unit capable of allowing liquid to enter a cell in its normal position of use while preventing liquid from leaving the cell upon physical inversion thereof.

It is still another object of my invention to provide a unit capable of converting the gaseous electrolysis products of a cell to moisture and condensing the moisture to liquid for return to the cell.

These and other objects of my invention are accomplished by providing a unit for controlling the internal pressurization of an electrochemical cell which evolves gas upon being electrically driven and for minimizing fluid losses from the cell. This unit is comprised of a means for converting at least a portion of the gas evolved by the electrochemical cell to liquid including a housing defining a reaction chamber. Also included is a means providing a fluid passage between the interior of the cell and the reaction chamber. This means includes valve means providing for the unidirectional displacement of gas from the interior of the cell to the reaction chamber and the countercurrent unidirectional displacement of liquid.

My invention may be better understood by reference to the following detailed description considered in conjunction with the drawings, in which.

Figure 1:
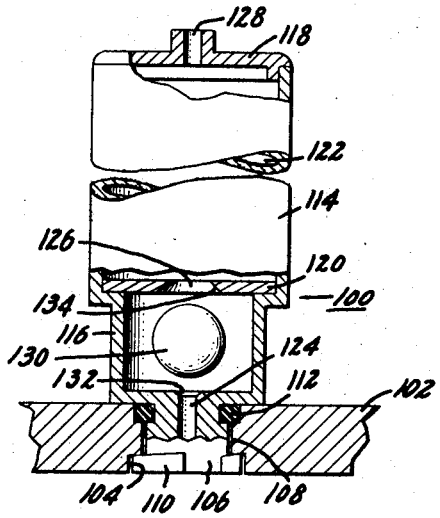
FIGURE 1 is an elevation with portions broken away and in section.

FIGURE 1 illustrates a unit 100 mounted on the casing 102 of an electrochemical cell which evolves gas upon being electrically driven. The casing is provided with an aperture 104 into which a stem portion 106 of the unit extends. Extending inwardly from the walls of the aperture are lugs 108 cooperating with lugs 110 on the stem portion. These lugs cooperate to form a bayonet-type joint. Accordingly, the stem portion is releasably fitted in the casing. An O-ring 112 seals between the unit and the casing.

An upper cylindrical portion 114 is integrally united to a lower cylindrical portion 116 which is in turn integrally united with the stem portion. A closure 118 is sealingly fitted to the upper end of the upper cylindrical portion. A barrier plate 120 is sealingly positioned at the junction of the upper and lower cylindrical portions. The closure, barrier plate, and upper cylindrical portion cooperate to form a housing defining a reaction chamber 122. A chemical for reacting with or catalyzing the reaction of at least one of the gaseous evolution products of the cell may be located in the reaction chamber. The chemical may be chosen from among those known to the art and may be positioned in the reaction chamber in any conventional manner. For example, the reaction chamber may be simply packed with chemical as taught by Henningan et al. or a separate mounting may be incorporated as disclosed by Gulick et al.

Fluid communication between the reaction chamber and the interior of the cell is provided by a passage 124 extending centrally through the stem portion, the hollow interior of the lower cylindrical portion and an opening 126 through the barrier plate. A port 128 is provided in the closure to communicate the reaction chamber with the atmosphere.

To control fluid displacement between the reaction chamber and the interior of the cell a spherical valve element 130 is mounted inside the lower cylindrical portion. The valve element is chosen to have a density less than the density of water. To accomplish this it may be of hollow construction or be formed of a material having a density less than the density of water. The stem portion is chamfered adjacent the upper end of the passage therethrough to form a first valve seat 132. Similarly the barrier plate is chamfered at the opening therein to form a second valve seat 134. The first valve seat is of a smaller diameter than the second valve seat. The density of the valve element and the diameter of the first valve seat are related so that when the interior of the lower cylindrical portion contains water the valve element may be floated from the first valve seat to permit water to drain through the passage into the cell. The density of the valve element and the diameter of the second valve seat are related so that upon inversion of the unit electrolyte filling the interior of the lower cylindrical portion will not be able to float the valve element from the second valve seat. Since the density of water and that of the electrolyte may be very nearly equal, the larger diameter of the second valve seat is relied upon to decrease the net lifting forces acting on the valve element. It is recognized, however, that in some cell applications the difference in the densities of water and electrolyte may be sufficiently large to be solely relied upon to either float the valve element from the first valve seat or to sink the valve element onto the second valve seat. It is considered that exact adjustments of valve seat diameters and valve element density for any specific application is considered to lie well within the ordinary skill of the art.

In order to illustrate the utility of the unit 100 an exemplary application will be assumed in which the unit is to be used in combination with a rechargeable nickel-cadmium cell having substantially equal positive and negative plate capacity so that it generates stoichiometric amounts of hydrogen and oxygen on overcharge. In such instance it is desirable to mount on the reaction chamber 122 a hydrogen-oxygen recombination catalyst, such as disclosed by Gulick et al. This may be accomplished by removing the closure 118, inserting the catalyst, and returning the closure to position. In the form of the unit in FIGURE 1 it is not necessary that the closure be sealed to the upper cylindrical portion 114. The unit is sealingly attached to the casing 102 of the cell by insertion of the stem portion 106 in the aperture 104 followed by rotation of the unit in a clockwise direction to wedge the lugs 108 and 110. This locks the bayonet joint and seals the O-ring 112 between the casing and the unit thereby preventing fluid from leaving the cell, except through the unit. For most practical applications the cell will have no other fluid outlets except for the aperture.

In the normal position of use the cell will be oriented so that the aperture is in the upper wall of the casing. In this orientation the valve element 130 will rest on the first valve seat 132. This serves to prevent air from entering the cell upon standing to slowly evaporate water from the electrolyte. When the cell is electrically driven so that hydrogen and oxygen are formed, as upon overcharge, a small gas pressure will develop inside the casing sufficient to lift the valve element from the first valve seat. The gas will then pass into the reaction chamber where it may be recombined to form water. A portion of the moisture formed may pass out of the unit through the port 128 in the form of water vapor. The port 128 is provided primarily, however, for displacement of gas initially filling the reaction chamber. It is contemplated that most of the water formed will be in liquid form and will drain through the opening 126 into the interior of the lower cylindrical portion. Water collecting inside the lower cylindrical portion will lift the valve element from the first valve seat, and the water will drain through the passage 124 back into the cell. Should the cell be inverted with the unit attached no electrolyte will drain from the cell since the valve element will seal against the second valve seat 134 of the barrier plate 120. It is then apparent that the valve element allows the unidirectional displacement of gas from the cell to the reaction chamber and allows the unidirectional displacement of liquid from the reaction chamber to the cell. In so doing the valve element allows protection against over-pressurization while at the same time minimizing permanent fluid losses from the cell.

Figure 2:
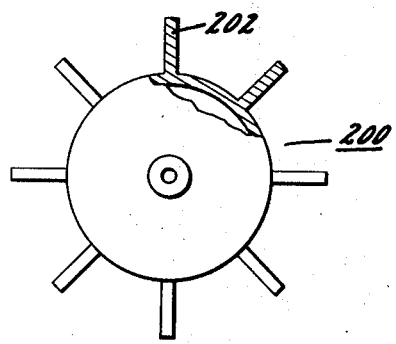
FIGURE 2 is a plan view of a modified form of my apparatus having a portion broken away.

FIGURE 2 illustrates a modified unit differing structurally by having heat transfer fins 202 formed integrally with the upper cylindrical portion. The recombination of hydrogen and oxygen to produce water is an exothermic reaction. Allowing this liberated heat to raise the temperature within the reaction chamber is objectionable, since this increases the vapor pressure of the water formed and may result in substantially portions of the water being exhausted to the atmosphere. In certain applications forming of the upper cylindrical portion or the entire housing out of a highly thermally conductive material may obviate the necessity of heat transfer fins. It is further noted that when heat transfer fins are employed it is not necessary that the housing be formed of a highly thermally conductive material, so long as a thermally conductive path is provided between the reaction chamber and the heat transfer fins. This may be readily accomplished, for example, by injection molding the upper cylindrical portion around thermally conductive heat transfer fins having their inner terminus within the reaction chamber.

Figure 3:
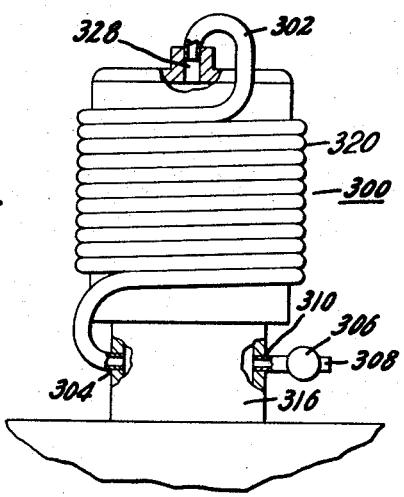
FIGURE 3 is an elevation with portions broken away of another modified form of my apparatus.

FIGURE 3 illustrates a modification of my invention. The unit 300 differs from the unit 100 by the addition of a means for condensing water vapor as well as a means for protecting against a negative pressure within the cell. As shown, a thermally conductive condensation coil 320 sealingly engages the port 328 at one end while the remaining end sealingly communicates with the interior of the lower cylindrical portion 316 at 304. Also, a check valve 306 is shown schematically controlling fluid passage through a conduit 308 communicating with the interior of the lower cylindrical portion at 310.

The unit operates substantially as the unit 100, but additionally makes provision for preventing the removal of any water from the cell to the atmosphere. Whereas unit 100 allows the possible loss of water vapor through the port 128, the unit 300 exhausts water vapor laden gas from the port 328 to the condensation coil 320. Since the coil is at a temperature lower than that of the reaction chamber, a portion of the water vapor condenses within the coil and drains by gravity into the lower cylindrical portion and from there back into the cell. Condensation in the coil, of course, produces a slight negative pressure which tends to draw more gas into the coil. It is possible that at least some of the gas entering the lower cylindrical portion along with the condensed moisture may still be chemically reactive. This gas is then in a position to be brought into contact with the chemical within the reaction chamber a second time. This increases the efficiency of the catalyst in chemically reacting all gas evolved.

The check valve 306 is an optional safety feature that may be located at any desired site on the unit or on the cell. Inasmuch as the unit 300 is a sealed unit allowing no communication with the atmosphere, it is considered desirable to provide for drawing air into the cell should a negative pressure develop therein. The use of a check valve could be obviated, however, merely by constructing the unit and cell out of sufficiently rigid materials so as to withstand the maximum anticipated pressure differential.

While I have described my invention with reference to certain preferred embodiments, it is appreciated that numerous modifications will readily occur to those skilled in the art. For example, instead of forming the stem portion, lower cylindrical portion, and upper cylindrical portion integrally these elements may be separately formed and later suitably united. Conversely, the barrier plate and closure may be integrally formed if desired. While a bayonet joint is shown locking the unit to the cell casing, any conventional equivalent locking mechanism may be employed. Although the condensation coil is shown wound around the exterior of the lower cylindrical portion, it could be mounted to one side of the cylindrical portion and it need not be of wound configuration. While a spherical valve element has been illustrated, valve elements of other geometric configuration could as well be substituted.

Accordingly, it is intended that the scope of my invention be determined with reference to the following claims.

What I claim as new and desire to secure by Letters Patent of the United States is:

1. A unit for controlling the internal pressurization of an electrochemical cell which evolves gas upon being electrically driven and for minimizing fluid losses from the cell which comprises
   means for converting at least a portion of the gas evolved by the electrochemical cell to liquid including a housing defining a reaction chamber and
   means providing a fluid passage between the interior of the cell and the reaction chamber including valve means between the cell and reaction chamber providing for the unidirectional displacement of gas from the interior of the cell to the reaction chamber and the countercurrent unidirectional displacement of liquid,
   said valve means being comprised of
      a valve element having a density less than the density of the liquid formed in said reaction chamber,
      means providing a first valve seat adjacent the cell,
      means providing a second valve seat adjacent the reaction chamber,
      said first valve seat being smaller in diameter than said second valve seat.

2. A cell unit for supplying electrical energy while reducing moisture losses upon prolonged standing, upon physical inversion, and upon being electrically driven comprising
   a rechargeable electrochemical cell provided with an aqueous electrolyte including as an external confining element a casing having an aperture therein,
   means for chemically converting to moisture the gas evolved from said cell while the latter is being chemically driven,
   said means defining a reaction chamber which is normally positioned above the aperture in said casing,
   means sealingly communicating the reaction chamber with the aperture of said casing for selectively controlling fluid displacement therebetween including a valve means comprised of
   a valve element having a density less than the density of water,
   means providing a first valve seat on the casing side of said valve element normally lying beneath said valve element,
   means providing a second valve seat on the reaction chamber side of said valve element normally lying above said valve element,
   said first valve seat being smaller in diameter than said second valve seat,
   whereby, said valve element will normally rest upon the first valve seat and prevent air from diffusing into said cell and evaporating said electrolyte upon prolonged standing of said cell, and
   upon said cell being electrically driven, gas evolved from said cell will displace said valve element from said first valve seat, enter the reaction chamber, and be at least partially chemically reacted to generate moisture, and
   condensed moisture will float said valve element from said first valve seat and re-enter said cell, and
   upon inversion of said cell, said valve element will cooperate with the second valve seat to prevent said electrolyte from draining from said cell into the reaction chamber.

3. A cell unit as described by claim 2 additionally including means for transferring heat from the reaction chamber.

4. A cell unit as described by claim 3 in which said reaction chamber defining means is provided with a port spaced from said communicating means and said heat transferring means is comprised of a thermally conductive fluid conduit extending between the port and said fluid communicating means externally of the reaction chamber.

5. A unit as described by claim 3 in which said heat transferring means is comprised of heat transfer fins lying in thermally conductive relation with said reaction chamber.

6. A cell unit as described by claim 4, further including a valve connected to said reaction chamber and having a connection to a source of fluid at ambient pressure for admitting fluid therefrom to said reaction chamber and therethrough to said conduit upon the occurrence of a pressure level within said reaction chamber of a predetermined value below said ambient pressure.

References Cited

UNITED STATES PATENTS

| 1,625,047 | 4/1927 | Mowry | 136—182.4 |
| 2,465,202 | 3/1949 | Craig | 136—179.1 |
| 2,615,062 | 10/1952 | Craig | 136—179.1 |
| 2,687,449 | 8/1954 | Gulick et al. | 136—179.5 |

FOREIGN PATENTS

| 214,177 | 4/1924 | Great Britain. |
| 303,799 | 4/1930 | Great Britain. |

WINSTON A. DOUGLAS, Primary Examiner

D. L. WALTON, Assistant Examiner

U.S. Cl. X.R.

136—179